Aug. 21, 1945.  E. C. ANDERTON  2,383,231
NUT-LOCK
Filed May 10, 1944
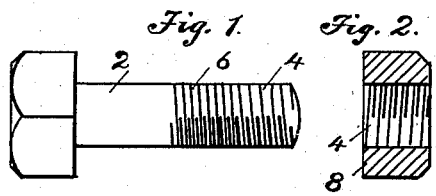
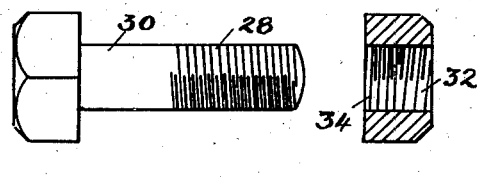
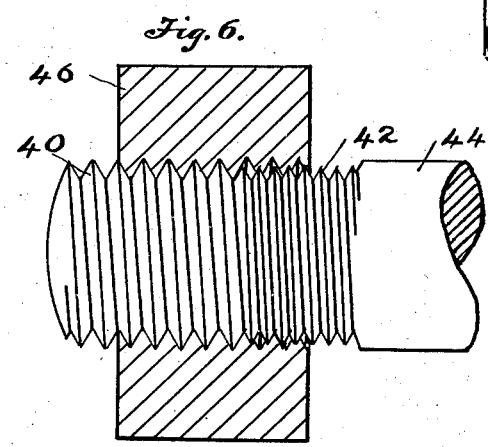
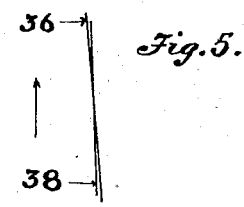
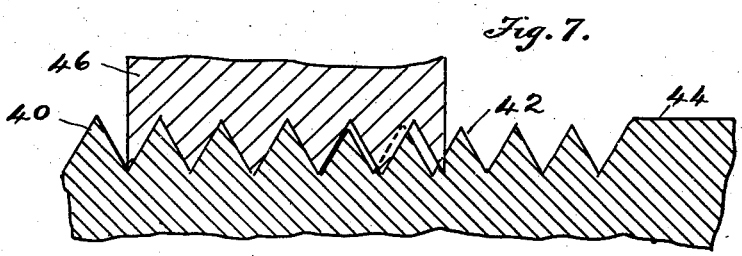
INVENTOR.
Edward Covey Anderton.
BY
Arthur Scrivenor.
Attorney.

Patented Aug. 21, 1945

2,383,231

UNITED STATES PATENT OFFICE 2,383,231

NUT LOCK

Edward Covey Anderton, Tappahannock, Va.

Application May 10, 1944, Serial No. 534,949

2 Claims. (Cl. 151—14)

My invention relates to nut-locks; and it has for its object the providing of a combination of a bolt and nut so threaded that, when the nut is run down, threads of a coarser pitch cut across and bend or break threads of a finer pitch, and jam the nut and bolt together by forcing parts of the finer threads into the interstices which open between the two differing threads, which effectively prevents the nut from backing off from any accidental cause, such as vibration. What I refer to as the forcing of parts of the finer thread into interstices may be the actual breaking off of parts of the finer thread and forcing them into interstices, or it may be the deformation of any part of the finer thread by curling it or bending it into the adjacent interstice. When two threads of differing pitch are laid upon one another it will be noted that the thread of one lies at an angle to the thread of the other; and that when the one is rotated against the other, the stronger thread will exert a side-cutting force against the weaker thread, and where they come into direct opposition the stronger thread will either break or bend or deform the weaker thread; and the weaker thread, that is, the thread of finer pitch, will be broken off into or bent into the interstice which will exist at the point of the bend between the two threads. A feature of this progressive curling or bending or partial breaking of the finer thread into the adjacent interstice is that it allows the nut to move in one direction, to tighten on the work, but jams it against movement in the other direction, to loosen.

The coarse thread and the finer thread may both be cut on the bolt, or they may both be cut in the nut. The arrangement of the two threads, when on the bolt, is that the finer thread is the nearer to the bolt head; in which case the nut is threaded to the same pitch as the thread which is the nearer to the end of the bolt. If the nut is threaded with the two differing threads, the thread which first engages the bolt thread is cut to the same pitch as the bolt thread; which thread is preferably the finer one. When necessary the nut may be given extra thickness to accommodate the two threads.

Considering the action of the nut thread in relation to the bolt thread, and when the nut is cut with the coarser thread: we shall see that the said coarser thread, as it engages the finer thread, will cut and will deform the latter in the direction in which the nut is moving. Each individual nut thread will tend to force the contiguous part of the finer bolt thread into the next valley or interstice between the two threads. So, as the nut advances over the bolt, more and more will the bolt thread be deformed and forced toward the preceding nut thread. In this way the anterior threads of the nut are jammed.

A feature of my invention is that the finer thread does not fill the spaces between the coarser threads. If we keep to the same shape of thread—the standard thread having an inclination of 60 degrees to the horizontal, making between any two threads a valley of 60 degrees—and cut the finer thread by only changing the longitudinal feed of the cutting tool, we shall have the two threads of differing outside diameters, but of the same root diameter. It is important to note that the outside diameter of the finer thread is less that the outside diameter of the coarser thread. The difference in height of the threads will increase as the difference in pitch of the threads increases.

In the drawing, which forms a part of this specification:

Figure 1 shows a bolt having a coarser thread and a finer thread.

Figure 2 shows, in section, the nut to be used with the bolt shown in Figure 1.

Figure 3 shows a bolt with a thread of fine pitch only.

Figure 4 shows the nut, having two differing threads, to be used with the bolt shown in Figure 3.

Figure 5 is a diagram showing the inclination of two threads to one another, the two threads differing in pitch.

Figure 6 is a part elevation of a bolt end, and a part section of a nut threaded on the bolt.

Figure 7 shows to a larger scale a partial view, in section, of the threads of a bolt and of a nut.

In Figure 1 is shown a bolt 2, on which the coarser thread 4 is cut at the end of the bolt, while the finer thread 6 is cut at the inner or bolt-head end of the coarser thread. Figure 2 shows the nut 8 for bolt 2, in which nut the coarser of the two threads is cut.

It is to be remembered that in all cases the depth of the coarser thread and the depth of the finer thread are the same. That is, the root diameter of the bolt is the same under each thread; and the root diameters of the nut threads, when they differ, are the same. Therefore the strength of the bolt, when it bears the differing threads, is the same throughout its length; and the strength of the nut, when its threads differ, is the same at either thread.

It is also to be noted that the difference in pitch of the two threads is made by changing the longitudinal feed of the cutting tool, which change may be made manually or automatically.

Since the setting of the cutting tool is not changed, the height of the finer thread will be less than the height of the coarser thread. The inclination of the side of the thread is not changed; the width of the base of the thread or the pitch is changed; therefore the height of the thread is changed.

Because of the difference in the height of the two threads, the finer thread will not, of itself, fill the space between two of the coarser threads; and the finer thread would be free to run in the coarser thread but for the difference in pitch. This difference will cause the coarser thread to ride over, cut into, bend, break, or otherwise deform the finer thread, jamming it into the contiguous interstice between itself and the next thread.

So, when the nut 8 is run down on thread 4 on bolt 2 and engages the finer thread 6, the coarser thread 4 will ride over, cut into, bend, break, or otherwise deform thread 6, and jam it or parts of it into the next interstice.

In Figures 3 and 4, the finer thread 28 is cut on the bolt 30; and the coarser thread 32 and the finer thread 34 are cut in the nut. In this case the finer thread 34 of the nut runs down bolt thread 28 until the coarser thread 32 cuts into the finer thread 28 of the bolt. Jamming ensues.

In this specification I refer to the two threads of differing pitch as the coarser thread and the finer thread. This simply means that one of the threads, the finer, is of less pitch and of more threads to the inch than the other. They may both be what are considered fine threads; or they may both be what would be considered coarse threads in some of the arts. The terms "coarser" and "finer" are used to distinguish between the two threads.

The difference in pitch of the two threads may be considerable, or it may be very small. The ratio of the two pitches may well be proportioned to the use to which the bolt is to be put.

The action of the coarser thread against the finer thread is shown in Figure 5; wherein the movement of the coarser and steeper thread 36 is indicated by the arrow, and wherein the side cutting action of thread 36 against thread 38 will be understood.

Figure 6 is designed to show the difference in pitch and in height between the coarser thread 40 and the finer thread 42 on the bolt 44; the nut 46 having the coarser thread 40. In considering the interaction of the two threads: it is the coarser thread of the nut, 40, which deforms and jams with the finer thread 42 on the bolt. In the drawing I have shown a coarse thread and a fine thread of considerable difference in pitch, so that the difference may be clearly seen. And for the same reason, the dimensions in Figures 6 and 7 have been magnified.

I claim:

1. An assembly of bolt and nut members in which one member thereof has a thread portion of coarse pitch and an immediately adjacent portion of fine pitch, while the other member has a thread of uniform pitch conforming to one of those of the first mentioned member; the relative positions of the threaded portions of unlike pitch being such that whether it be on the bolt or on the nut the fine pitch portion will lie between the bolt head and the coarse pitch portion.

2. An assembly of bolt and nut members in which one member thereof has a thread portion of coarse pitch and an immediately adjacent portion of fine pitch, the thread of coarse pitch and the thread of fine pitch having the same root diameter; while the other member has a thread of uniform pitch conforming to one of those of the first mentioned member; the relative positions of the threaded portions of unlike pitch being such that whether it be on the bolt or on the nut the fine pitch portion will lie between the bolt head and the coarse pitch portion.

EDWARD COVEY ANDERTON.